United States Patent
Darlington, Jr. et al.

(10) Patent No.: US 7,119,137 B2
(45) Date of Patent: Oct. 10, 2006

(54) MOISTURE-IMPERVIOUS WATER-SWELLABLE CLAY-CONTAINING "WATER-STOP" COMPOSITION

(75) Inventors: Jerald W. Darlington, Jr., Marengo, IL (US); Natalie A. Dotlich, Buffalo Grove, IL (US)

(73) Assignee: AMCOL International Corporation, Arlington Heights, IL (US)

(*) Notice: Subject to any disclaimer, the term of this patent is extended or adjusted under 35 U.S.C. 154(b) by 249 days.

(21) Appl. No.: 10/666,315

(22) Filed: Sep. 18, 2003

(65) Prior Publication Data
US 2005/0065262 A1  Mar. 24, 2005

(51) Int. Cl.
*C08K 3/34* (2006.01)
*C08J 3/20* (2006.01)
*C08J 3/12* (2006.01)

(52) U.S. Cl. ............ 524/445; 524/447; 428/451; 428/454

(58) Field of Classification Search ............ 524/444, 524/447, 445; 428/451, 454
See application file for complete search history.

(56) References Cited

U.S. PATENT DOCUMENTS

| | | | |
|---|---|---|---|
| 4,366,284 A | 12/1982 | Ishido et al. |
| 4,534,926 A | 8/1985 | Harriett |
| 4,656,062 A | 4/1987 | Harriett |
| 4,668,724 A | 5/1987 | Harriett |
| 4,733,989 A | 3/1988 | Harriett |
| 4,787,780 A | 11/1988 | Harriett |
| 4,810,573 A | 3/1989 | Harriett |

*Primary Examiner*—Kriellion Sanders
(74) *Attorney, Agent, or Firm*—Marshall, Gerstein & Borun LLP

(57) ABSTRACT

A water-swelling composition adapted to be secured to an area of potential water flow in the form of a flexible cohesive mass comprising about 10% to about 90% by weight of a water-swellable layered material; about 1% to about 30% by weight of an elastomer; about 8% to about 65% by weight of a material selected from the group consisting of polypropene, polybutene, and a mixture thereof; and about 0.1% to about 20% by weight of a clay binder selected from group consisting of (1) an onium ion-liberating compound that is ion-exchanged with platelet cations of the layered material, (2) a coupling agent that is reacted with the layered material, and (3) a combination thereof.

7 Claims, No Drawings

MOISTURE-IMPERVIOUS WATER-SWELLABLE CLAY-CONTAINING "WATER-STOP" COMPOSITION

FIELD OF THE INVENTION

The present invention is directed to a "water-stop" water-swellable clay-containing composition capable of increased swelling upon hydration, after installation and contact with water, and the method of manufacturing the composition. More particularly, the clay composition includes a clay binder capable of intercalating between and ion-exchanging with one or more interlayer cations on water-swellable clay platelet surfaces to achieve increased swelling when the clay is hydrated.

BACKGROUND OF THE INVENTION AND PRIOR ART

This Assignee's Harriett U.S. Pat. Nos. 4,668,724; 4,534,926; 4,656,062; 4,810,573; 4,733,989; and 4,787,780; as well as Hayakawa Rubber Company's U.S. Pat. No. 4,366,284 all hereby incorporated by reference, disclose water-swellable clay-containing compositions that are well known water-stop compositions, sold for years in the form of a rope or rod, that are capable of swelling upon contact with water for water-stop purposes.

These prior art compositions contain a water-swellable smectite clay, such as sodium montmorillonite or sodium bentonite, in an amount of about 10% to 90% by weight; polypropene, polybutene, or a mixture in an amount of about 8–65% by weight; and an elastomer, such as butyl rubber, or a plasticizer in an amount of about 1–20% by weight.

The rod-, or rope-shaped water-swellable clay compositions described herein generally are disposed in a joint gap between two adjacent structural numbers, such as between two separately poured concrete sections, during construction. The clay composition, for example, is disposed in contact with a cured concrete section prior to pouring an adjacent concrete section such that the composition is disposed between and in contact with the two concrete sections. By this placement, the rod- or rope shaped clay composition, when swelled by water, expands to profile the adjacent surfaces of the structural members to fill any voids in the joint between the two structural members. The clay compositions, due to the substantial expansion, prevents water penetration in the joint between the adjacent structural members.

SUMMARY OF THE INVENTION

In brief, the water-swellable compositions described herein are used to make a waterproofing article. The compositions preferably are in the form of rod-, or rope-shaped water-swellable clay-containing articles. Also described herein are methods of waterproofing using the article, wherein the clay containing composition includes a clay binder selected from (1) an ion-exchange compound capable of ion-exchanging with internal clay platelet cations and/or (2) a clay coupling agent compound capable of reaction with clay platelet hydroxyl moieties extending from the clay platelet edges.

A further object of the present invention is to provide a new and improved water barrier and method of manufacturing the water barrier, comprising a water-impermeable composition containing a water-swellable colloidal clay, such as sodium bentonite or sodium montmorillonite clay; polypropene and/or polybutene; and a clay binder selected from an onium ion-liberating compound and/or a —OH reactive coupling agent.

These and other aspects, features, and advantages of the present invention will be apparent to those of ordinary skill in the art in view of the following detailed description of the preferred embodiments.

DETAILED DESCRIPTION OF THE PREFERRED EMBODIMENTS

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Whenever used in this Specification, the terms set forth shall have the following meanings:

"Polypropene" shall mean a polymer having a structural formula $(C_3H_6)_n$, wherein n ranges from about 7 to about 60, having a weight average molecular weight from about 300 to about 2,500.

"Polybutene" shall mean a polymer having a structural formula $(C_4H_8)_n$, wherein n ranges from about 6 to about 45, having a weight average molecular weight in the range of bout 300 to about 2,500, and includes polyisobutylene.

"Layered Material" shall mean a layered phyllosilicate material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes an onium ion spacing/compatibilizing agent disposed between adjacent platelets of the Layered Material to increase the interlayer spacing between the adjacent platelets at least 3 Å, preferably at least 5 Å, to an interlayer spacing, for example, of at least about 10 Å, preferably at least about 15 Å, e.g., 18 Å; the Layered Material has been reacted at some of the —OH functionalities, at the platelet edges, with a coupling agent; and co-intercalated with an oligomer or polymer co-intercalant, to increase the d-spacing to at least about 20 Å, preferably to 25 Å to 35 Å.

"Coupling Agent-Treated or "Coupling Agent-Treatment" or "Coupling Agent-Reacted" shall mean the contact of a layered material with a coupling agent, e.g., a silane coupling agent, a titanate coupling agent, a zirconate coupling agent and/or an aluminate coupling agent to produce a condensation reaction between the coupling agent and —OH radicals at the edges of the platelets of the Layered Material.

"Intercalation" shall mean a process for forming an Intercalate.

"Onium Ion Clay Binder" or "Onium Ion Compound" shall mean an organic compound that includes a positively charged atom selected from the group consisting of a nitrogen atom, a phosphorous atom, a sulfur atom or an oxygen atom, preferably a quaternary ammonium compound, and when dissolved in water and/or an organic solvent, an anion dissociates from the onium ion compound leaving an onium cation that can ion-exchange with a silicate platelet exchangeable cation, e.g., $Na^+$, $Ca^{+2}$, $Li^+$, $Mg^{+2}$, or $K^+$, thereby binding to the silicate platelet inner surface.

"Co-Intercalation" shall mean a process for forming an intercalate by intercalation of an onium ion clay binder agent and, at the same time or separately, intercalation of polypropene and/or polybutene.

"Exfoliate" or "Exfoliated" shall mean individual platelets of the layered material, or tactoids or clusters of individual platelets, e.g., 2–10 platelets, preferably 2–5 platelets, that are smaller in total thickness than the non-exfoliated Layered Material, dispersed as individual platelets or tactoids throughout the composition.

"Exfoliation" shall mean a process for forming an Exfoliate from an Intercalate.

"CAR Material" shall mean a Layered Material that has been Coupling Agent Reacted at a portion of the —OH groups contained on Layered Material platelet edges.

In accordance with the preferred embodiment of the present invention, the water-proofing article 10 includes a water-swellable clay-containing composition 22, preferably a water-swellable clay intimately mixed with a polypropene, a polybutene or a mixture of polypropene and polybutene, and a clay binding ion-exchange or coupling agent compound, to provide a composition having an unexpected capacity for swelling upon contact with water. Preferably, a water-swellable clay, for example, sodium bentonite, is included in the adhesive composition in an amount of about 10% to about 90% by total weight of the composition, and polypropene and/or polybutene is included in the clay composition in an amount of about 8% to about 65% by weight of the composition together with an elastomer in an amount about 1% to about 30% by weight of the composition. In accordance with an important feature of the present invention the composition includes a clay binder that is ion-exchanged with clay platelet cations on internal negative charge sites of the clay platelets, or reacted with hydroxyl moieties at the clay platelet edges to achieve unexpected water-swellability and composition structural integrity of the compositions described herein.

To achieve the full advantage of the preferred embodiment of the present invention, the composition 22 should include polypropene, polybutene or mixtures thereof in an amount of at least about 8% by weight. Additional tackifiers compatible with the polypropenes or polybutenes may be included for additional tack so long as the polypropene, polybutene or mixture is included in at least about 8% by weight, preferably at least about 10% by weight of the composition. Additional compatible tackifiers may include, for example, aliphatic petroleum hydrocarbon resins, such as, polyterpenes, hydrogenated resins, and mixed olefins. Generally, aromatic tackifiers are not suitable since they will bleed to the surface of the composition and separate, thereby reducing the handleability and consistency of the composition. Other additives, such as viscosity controlling agents, fillers, tackifiers and the like may be added in a total amount up to about 20% by weight of the adhesive composition to impart any desired physical characteristics to the clay composition.

The water-swellable clay utilized in the compositions of the present invention can be any water-swellable layered material, such as a smectite clay, which will swell upon contact with water, i.e., will swell in the presence of water. Preferably, the clay is a smectite clay, such as a montmorillonite or a bentonite clay. A preferred bentonite is sodium bentonite which is basically a hydratable montmorillonite clay of the type generally found in the Black Hills region of South Dakota and Wyoming. This clay has sodium as a predominant exchange cation. However, the clay utilized in accordance with this embodiment of the present invention may also contain other cations such as magnesium and iron. There are cases wherein a montmorillonite predominant in calcium ions can be converted to a high swelling sodium variety through a well known process called "peptizing". The clay utilized in this invention may be one or more peptized bentonites. The clay may also be any member of the dioctahedral or trioctahedral smectite group or mixtures thereof. Examples are Beidellite, Nontronite, Hectorite and Saponite. The clay, i.e., bentonite or montmorillonite, generally is finely divided as known for use in water barrier panels and the like, e.g., 200 mesh to 425 mesh, or smaller for unexpectedly faster water-swelling. The preferred clay particle size distribution includes at least 80 percent by weight particles within the range of 30 μm to 75 μm and less than 20% by weight of the particles having a size smaller than 30 μm.

The polybutenes that may form part of the preferred water-swellable clay composition embodiment of the present invention, generally comprise $(C_4H_8)_n$, where n ranges from about 6 to about 45, having average molecular weights in the range of about 300 to about 2,500. The commercially available useful polybutenes are predominantly of high molecular weight mono-olefins and can include 100% of the polybutene or include up to about 10% isoparaffins. The polybutenes are chemically stable, permanently fluid liquids and their tackiness increases with increased molecular weight. The viscosities of the polybutenes range from a consistency of a light oil to a highly viscous fluid having a viscosity range of about 25 to about 4,000 centipoises. The lower viscosity polybutenes can be combined with a water-swellable clay to provide a composition having a soupy consistency which is very tacky and difficult to handle depending upon the quantity of water-swellable clay included within the clay composition of the multi-layer articles of the present invention.

The polypropenes that may form part of the preferred water-swellable clay composition generally comprise $(C_3H_6)_n$, where n ranges from about 7 to about 60 having molecular weights in the range of about 300 to about 2,500. The commercially available polypropenes useful in the preferred clay composition generally are amorphous in character and may be combined with up to about 10% by weight of a suitable processing solvent, such as ligroin, although the polypropenes may be blended with the bentonite easily at elevated temperatures, i.e., 200° C. without a solvent.

To achieve the greatest swelling of the preferred compositions of the present invention, the polypropene or polybutene or mixtures should be present in the composition in an amount of about 10% to about 30% by weight of the total composition, preferably about 10% to about 20% by weight of the total composition.

The interlaminar spacing (d-spacing) of adjacent layers (platelets) of the layered material (clay) is expanded at least about 3 Å, preferably at least about 5 Å, to a basal spacing of at least about 10 Å, preferably to at least about 15 Å, and usually to about 18 Å by contacting the layered material with the onium ion and/or coupling agent clay binder for subsequent intercalation with the polypropene and/or polybutene, and/or the elastomer, e.g., butyl rubber. The clay binders useful in the water-swelling compositions and methods described herein may be an onium ion and/or a coupling agent. It is theorized that the onium ion and/or the coupling agent cross link the clay to the elastomer of the compositions to achieves increased swelling of the compositions upon hydration. The onium ion may be primary, secondary, tertiary or quaternary and preferably is a long chain ($C_6^+$) onium ion spacing/compatibilizing agent having at least one binding (ion-exchange) site capable of ion-exchanging or replacing $Li^+$, $Na^+$, $K^+$, $Ca^+$, $Mg^{+2}$, or other inorganic cations that occur within the interlayer spaces between adjacent layers or platelets of the layered materials. The association of the layered material inorganic cations with the onium ion spacing/compatibilizing agent via ion-exchange enables the conversion of the hydrophilic interior clay platelet surfaces to hydrophobic platelet surfaces. Therefore, oligomers or polymers can be easily intercalated between adjacent platelets of the layered material, e.g., smectite clay platelets.

The intercalation of the onium ions and subsequent intercalation of the polypropene and/or polybutene and/or the elastomer, e.g., butyl rubber, results in a completely homogeneous dispersion of intercalated layered material and/or exfoliated platelets dispersed in polypropene and/or polybutene.

Optionally, the nanocomposite material can be sheared to exfoliate up to 100% of the tactoids or platelet clusters into individual platelets, preferably such that more than 80%; or more than 90% by weight of the layered material can be completely exfoliated into single platelet layers. Quick, easy, and completely homogeneous dispersion of the onium ion exchanged or coupling agent-reacted layered material cross-linked to the elastomer, e.g., butyl rubber, in the compositions is achieved and the resulting intercalated clay has increased d-spacing, unexpected water-swellability, and homogeneous dispersion of the resulting intercalate and/or exfoliate throughout the composition.

Clay Binder Onium Ions

In accordance with one embodiment of the present invention, intercalates are prepared by contacting a phyllosilicate with a monomeric onium ion spacing/compatibilizing agent compound. To achieve the full advantage of the present invention, the onium ion should include at least one long chain radical ($C_6^+$) that may be aliphatic, straight or branched chain, or aralkyl. Exemplary of such suitable $C_6^+$ onium ion molecules include primary, secondary, tertiary or quaternary ammonium ions, sulfonium ions, phosphonium ions, oxonium ions, or any ion of an element in Groups V or VI of the periodic table of elements.

In accordance with an important feature of the present invention, best results are achieved by mixing the layered material with the onium ions, e.g., $C_6^+$ onium ion spacing coupling agent-reacted, in a concentration of at least about 2% by weight, preferably at least about 5% by weight onium ion compound, more preferably at least about 10% by weight onium ion compound, and most preferably about 20% to about 50% by weight, based on the weight of onium ion compound and carrier (e.g., water, with or without an organic solvent for the onium ion compound) to achieve better sorption of the onium ion spacing/compatibilizing agent compound between the platelets of the layered material. The onium ion spacing/compatibilizing agent compound ion-exchanged with and bonded to (or complexed with) the alumino silicate platelets via ion-exchange results in surprising water-swellability.

In accordance with an important feature of the present invention, it has been found that a coupling agent-reacted or onium ion-intercalated layered material, e.g. a phyllosilicate, such as a smectite clay, can be easily intercalated with the polypropene and/or polybutene to form an onium ion/polypropene and/or onium ion/polubutene intercalate that has excellent intercalate dispersibility in the compositions disclosed herein, particularly better water-swellability.

In one embodiment, the onium ion clay binder is introduced into the layered material galleries in the form of a solid or liquid composition (neat or aqueous, with or without an organic solvent, e.g., an aliphatic hydrocarbon, such as heptane to, if necessary, aid to dissolve the onium ion compound) having an onium ion clay binder agent concentration sufficient to provide a concentration of about 5% to about 10% by weight of the clay (90–95% water) and the onium ion compound is dissolved in the clay slurry water, preferably at a molar ratio of onium ions to exchangeable interlayer cations of at least about 0.5:1, more preferably at least about 1:1. The onium ion-intercalated clay then is separated from the water easily, since the clay is now hydrophobic, and may be dried in an oven to less than 5% water, before being combined with any optional composition additives. The onium ion clay binder agent compound can be added as a solid with the addition to the layered material, onium ion compound blend of preferably at least about 20% water, more preferably at least about 30% water or more, based on the dry weight of layered material. Preferably about 30% to about 50% water, more preferably about 30% to about 40% water, based on the dry weight of the layered material, is included in the onium ion intercalating composition, so that less water is sorbed by the intercalate, thereby necessitating less drying energy after onium ion intercalation.

The onium ion clay binder cations intercalated via ion-exchange into the interlayer spaces between adjacent layered material platelets are primary, secondary, tertiary or quaternary onium ions having the following preferred structure:

wherein X=N, P, S, or O; and wherein $R_1$, $R_2$, $R_3$ and $R_4$ are H or organic moieties, such as linear or branched alkyl, aryl or aralkyl moieties having 1 to about 24 carbon atoms.

The more preferred $C_6^+$ onium ions are preferably quaternary ammonium ions having Formula (1), as follows:

(1)

Wherein R1 is a long chain alkyl moiety ranging from $C_6$ to $C_{24}$, straight or branched chain, including mixtures of long chain moieties, i.e., $C_6$, $C_8$, $C_{10}$, $C_{12}$, $C_{14}$, $C_{16}$, $C_{18}$, $C_{20}$, $C_{22}$ and $C_{24}$, alone or in any combination; and $R_2$, $R_3$ and $R_4$ are moieties, same or different, selected from the group consisting of H, alkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation.

Additional useful multi-charged onium ions include for example, tetra-, tri-, and di-onium species such as tetra-ammonium, tri-ammonium, and di-ammonium (primary, secondary, tertiary, and quaternary), -phosphonium, -oxonium, or -sulfonium derivatives of aliphatic, aromatic or arylaliphatic amines, phosphines, esters, alcohols and sulfides. Illustrative of such materials are di-onium compounds of the formula:

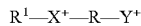

where $X^+$ and $Y^+$, same or different, are ammonium, sulfonium, phosphonium, or oxonium radicals such as —$NH(CH_3)_2^+$, —$NH_2(CH_3)^+$, —$N(CH_3)_3^+$,
—$N(CH_3)_2(CH_2CH_3)^+$, —$N(CH_3)(CH_2)CH_3)_2^+$,
—$S(CH_3)_2^+$,
—$S(CH_3)_2^+$, —$P(CH_3)_3^+$, —$NH_3^+$, and the like; R is an organic spacing, backbone radical, straight or branched, preferably having from 2 to 24, more preferably 3 to 10 carbon atoms, in a backbone organic spacing molecule covalently bonded at its ends to charged $N^+$, $P^+$, $S^+$ and/or $O^+$ cations and $R^1$ can be hydrogen, or an alkyl radical of 1 to 22 carbon atoms, linear or branched, preferably having at least 6 carbon atoms. Examples of R include substituted or unsubstituted alkylene, cycloalkenylene, cycloalkylene, arylene, alkylarylene, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Examples of $R^1$ include non-existent; H; alkyl having 1 to 22 carbon atoms, straight chain or branched; cycloalkenyl; cycloalkyl; aryl; alkylaryl, either unsubstituted or substituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Illustrative of useful R groups are alkylenes, such as methylene, ethylene, octylene, nonylene, tert-butylene, neopentylene, isopropylene, sec-butylene, dodecylene and the like; alkenylenes such as 1-propenylene, 1-butenylene, 1-pentenylene, 1-hexenylene, 1-heptenylene, 1-octenylene and the like; cycloalkenylenes such as cyclohexenylene, cyclopentenylene and the like; alkanoylalkylenes such as butanoyl octadecylene, pentanoyl nonadecylene, octanoyl pentadecylene, ethanoyl undecylene, propanoyl hexadecylene and the like; alkylaminoalkylenes, such as methylamino octadecylene, ethylamino pentadecylene, butylamino nonadecylene and the like; dialkylaminoalkylene, such as dimethylamino octadecylene, methylethylamino nonadecylene and the like; arylaminoalkylenes such as phenylamino octadecylene, p-methylphenylamino nonadecylene and the like; diarylaminoalkylenes, such as diphenylamino pentadecylene, p-nitrophenyl-p'-methylphenylamino octadecylene and the like; alkylarylaminoalkylenes, such as 2-phenyl-4-methylamino pentadecylene and the like; alkylsulfinylenes, alkylsulfonylenes, alkylthio, arylthio, arylsulfinylenes, and arylsulfonylenes such as butylthio octadecylene, neopentylthio pentadecylene, methylsulfinyl nonadecylene, benzylsulfinyl pentadecylene, phenylsulfinyl octadecylene, propylthiooctadecylene, octylthio pentadecylene, nonylsulfonyl nonadecylene, octylsulfonyl hexadecylene, methylthio nonadecylene, isopropylthio octadecylene, phenylsulfonyl pentadecylene, methylsulfonyl nonadecylene, nonylthio pentadecylene, phenylthio octadecylene, ethyltio nonadecylene, benzylthio undecylene, phenethylthio pentadecylene, sec-butylthio octadecylene, naphthylthio undecylene and the like; alkoxycarbonylalkylenes such as methoxycarbonylene, ethoxycarbonylene, butoxycarbonylene and the like; cycloalkylenes such as cyclohexylene, cyclopentylene, cyclo-octylene, cycloheptylene and the like; alkoxyalkylenes such as methoxy-methylene, ethoxymethylene, butoxymethylene, propoxyethylene, pentoxybutylene and the like; aryloxyalkylenes and aryloxyarylenes such as phenoxyphenylene, phenoxymethylene and the like; aryloryalkylenes such as phenoxydecylene, phenoxyoctylene and the like; arylalkylenes such as benzylene, phenthylene, 8-phenyloctylene, 10-phenyldecylene and the like; alkylarylenes such as 3-decylphenylene, 4-octylphenylene, 4-nonylphenylene and the like; and polypropylene glycol and polyethylene glycol substituents such as ethylene, propylene, butylene, phenylene, benzylene, tolylene, p-styrylene, p-phenylmethylene, octylene, dodecylene, octadecylene, methoxy-ethylene, moieties of the formula —$C_3H_6COO^-$, —$C_5H_{10}COO^-$, —$C_7H_{10}COO^-$, —$C_7H_{14}COO^-$, —$C_9H_{18}COO^-$, —$C_{11}H_{22}COO^{31}$, —$C_{13}H_{26}COO^-$, —$C_{15}H_{30}COO^-$, and —$C_{17}H_{34}COO^-$ and —$C{=}C(CH_3)COOCH_2CH_2^-$, and the like. Such tetra-, tri-, and di-ammonium, -sulfonium, -phosphonium, -oxonium; ammonium/sulfonium; ammonium/phosphonium; ammonium/oxonium; phosphonium/oxonium; sulfonium/oxonium; and sulfonium/phosphonium radicals are well known in the art and can be derived from the corresponding amines, phosphines, alcohols or ethers, and sulfides.

The preferred multi-charged oniom ion compounds are multi-onium ion compounds that include at least two primary, secondary, tertiary or quaternary ammonium, phosphonium, sulfonium, and/or oxonium ions having Formula (2), as follows:

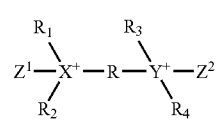

(2)

wherein R is an alkylene, aralkylene or substituted alkylene charged atom spacing moiety, preferably ranging from $C_3$ to $C_{24}$, more preferably about $C_3$ to $C_6$ for relatively high charge density (150 milliequivalents/100 grams C.E.C. to 70 milliequivalents/100 grams C.E.C.) layered materials; and preferably from $C_6$ to $C_{12}$ for medium to low charge density (70 milliequivalents/100 grams C.E.C. to 30 milliequivalents/100 grams C.E.C.) layered materials. R can be straight or branched chain, including mixtures of such moieties, i.e., $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$ and $C_{24}$, alone or in any combination; and $R_1$, $R_2$, $R_3$ and $R_4$ are moieties, same or different, selected from the group consisting of hydrogen, alkyl, aralkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation. $Z^1$ and $Z^2$, same or different, may be non-existent, or may be any of the moieties described for $R_1$, $R_2$, $R_3$ or $R_4$. Also, one or both of $Z^1$ and $Z^2$ may include one or more positively charged atoms or onium ion molecules.

Clay Binder Coupling Agents:

Suitable coupling agents clay binders include the following, and mixtures of any two or more: octyltriethoxysilane, methyltriethoxysilane, methyltrimethoxysilane, tris-[3-(trimeth-oxysilyl)propyl]isocyanurate, vinyltriethoxysilane, vinyltrimethoxysilane, vinyl-tris-(2-methoxyethoxy) silane, vinylmethyldimethoxysilane, gamma-methacryloxypropyltrimethoxysilane, beta-(3,4-epoxycyclohexyl)ethyltrimethoxysilane, gamma-glycidoxypropyltrimethoxysilane, gamma-mercaptopropyl-trimethoxysilane, proprietary polysulfide silane, bis-(3-[triethoxysilyl]propyl) tetrasulfane, proprietary disulfide silane, gamma-aminopropyltriethoxysilane, aminoalkyl silicone solution, modified aminoorganosilane, gamma-amino-propyltrimethoxysilane, N-beta-(aminoethyl)-gamma-aminopropyltrimethoxy-silane, modified aminoorganosilane (40% in methanol), modified aminosilane (50% in methanol), triaminofunctional silane, bis-(gamma-trimethoxysilyl-propyl)amine, N-phenyl-gamma-aminopropyltrimethoxysilane, organomodified polydimethylsiloxane, polyazamide silane (50% in methanol), N-beta-(amino-ethyl)-gamma-aminopropylmethyldimethoxysilane, gamma-ureidopropyltrialk-oxysilane (50% in methanol), gamma-ureidopropyltrimethoxysilane, and gamma-isocyanatopropyltriethoxysilane.

Any swellable layered material that sufficiently ion-exchanges with an onium ion clay binder compound at the internal platelet faces to increase the interlayer spacing between adjacent phyllosilicate platelets at least about 3 Å, preferably at least about 5 Å, can be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" or "d-spacing" refers to the distance between the internal faces of the adjacent layers as they are assembled in the layered material before any delamination (exfoliation) takes place. The preferred clay materials generally include interlayer cations such as $Na^+$, $Ca^{+2}$, $K^+$, $Mg^{+2}$, $NH_4^+$ and the like, including mixtures thereof, particularly $Na^+$.

The amount of onium ion compound intercalated into the swellable layered materials, in order that the intercalated layered material platelet surfaces sufficiently complex or bond via ion-exchange to the onium ion molecules such that the layered material may be sufficiently spaced for easy intercalation of the polypropene and/or polybutene may vary substantially between about 2%, preferably at least about 10%, and up to about 80%, based on the dry weight of the layered material. In the preferred embodiments of the invention, amounts of onium ion employed, with respect to the dry weight of layered material being intercalated, will preferably range from about 8 grams of onium ion clay binder compound:100 grams of layered material (dry basis), preferably at least about 10 grams of onium ion clay binder compound: 100 grams of layered material to about 80–90 grams onium ion clay binder compound:100 grams of layered material. More preferred amounts are from about 20 grams of onium ion clay binder compound:100 grams of layered material to about 60 grams of onium ion clay binder compound:100 grams of layered material (dry basis).

The onium ions may be introduced into and ion-exchanged with the layered silicate platelet surface within the interlayer spaces of the layered material in a number of ways. In a preferred method of intercalating the onium ions between adjacent platelets of the layered material, the layered material is slurried in water, e.g., at 0.05–20% by weight layered material and 80–99.95% by weight water, and the onium ion compound is dissolved in the water in which the layered material is slurried. If necessary, the onium ion compound can be dissolved first in an organic solvent, e.g., propanol. The layered material then is separated from the slurry water and preferably dried to 0% to about 20% by weight moisture, preferably about 5% to about 15% by weight moisture, based on the dry weight of the layered material, prior to compounding with the polypropene and/or polybutene and any other composition compounds. The coupling agent may be reacted with the layered material, preferably in an amount of about 2–4% by weight, based on the weight of the layered material, before or after (or simultaneously with) the onium ion-exchange intercalation. Preferred reaction conditions (which may vary considerably) include a temperature of about 70–75° C., a pH of about 3–5, to completion of the reaction. The coupling agent reaction can be performed in a slurry media or dry blending conditions. These lower reaction temperatures are preferred to allow the coupling agent to react at edge hydroxy groups more homogenously over the entire layered material edges. In addition, the coupling agent may be introduced to the layered silicate in situ during the polymer melt compounding process. In a preferred method of intercalating the polymer, the coupling agent reacted and onium ion-treated layered material is intimately mixed with the polymer, e.g., by extrusion or pug milling, to form an intercalating composition comprising the coupling agent-reacted/onium ion-intercalated layered material and the intercalant polymer.

To achieve sufficient intercalation of the onium ions between adjacent platelets of the layered material, the layered material contains at least about 5% by weight, preferably at least about 10% by weight onium ion compound, based on the dry weight of the layered material, so that the resulting onium ion-intercalated layered material has interior platelet surfaces that are sufficiently hydrophobic and sufficiently spaced for intercalation of the polypropene and/or polybutene. When a coupling agent clay binder is used instead of or in addition to the onium ion clay binder, the amount of the coupling agent should be at least 0.1% by weight, based on the dry weight of the layered material, preferably in the range of 0.5% to 60% by weight, based on the dry weight of the layered material. The onium ion carrier (preferably water, with or without an organic solvent) can be added by first solubilizing or dispersing the onium ion compound in the carrier; or a dry onium ion compound and relatively dry coupling agent-treated phyllosilicate (preferably containing at least about 4% by weight water) can be blended and the intercalating carrier added to the blend, or to the phyllosilicate prior to adding the dry onium ion. When intercalating the phyllosilicate with onium ions in slurry form (e.g., 900 pounds water, 100 pounds phyllosilicate, 100 pounds onium ion compound), the amount of water can vary substantially, e.g., from about 4% by weight, preferably from a minimum of at least about 30% by weight water, with no upper limit to the amount of water in the intercalating composition (the phyllosilicate intercalate is easily separated from the intercalating composition due to its hydrophobicity after onium ion treatment).

Alternatively, the onium ion intercalating carrier, e.g., water, with or without an organic solvent, can be added directly to the coupling agent-treated phyllosilicate prior to adding the onium ion compound, either dry or in solution. Ion-exchange of the onium ion compound molecules may be performed by exposing the coupling agent-treated layered material to a dry or liquid onium ion compound in the onium ion intercalating composition containing at least about 2% by weight, preferably at least about 5% by weight onium ion compound, more preferably at least about 10% onium ion compound, based on the dry weight of the layered material.

In accordance with another method of intercalating the onium ions, polypropene and/or polybutene between the platelets of the layered material, the layered material, preferably containing at least about 4% by weight water, more preferably about 10% to about 15% by weight water, is blended with water and/or organic solvent solution of an onium ion clay binder compound in a ratio sufficient to provide at least about 5% by weight, preferably at least about 10% by weight onium ion compound, based on the dry weight of the layered material. The onium ion compound can be intercalated into the layered material simultaneously with a coupling agent clay binder and simultaneously with the intercalation of the polypropene and/or polybutene, or, the polypropene and/or polybutene may be intercalated after coupling agent-reaction and intercalation of the onium ion spacing/compatibilizing agent. In preferred embodiment, the dry onium ion-intercalated clay is extruded with polypropene and/or polybutene for direct compounding, with intercalation of the oligomer or polymer melt into the coupling agent-reacted (CAR Material) and onium ion-intercalated layered material.

The onium ion clay binder compounds have an affinity for the phyllosilicate so that they are ion-exchanged with the exchangeable cations on the inner surfaces of the silicate platelets, in the interlayer spaces. The coupling agent clay binder compounds react with clay platelet edge —OH moieties to form a covalent bond at the clay platelet edges.

The addition of an elastomer in an amount of about 1% to about 20%, preferably about 1% to about 20%, more preferably in an amount of about 2% to about 10%, based on the total weight of the preferred water-swellable clay compositions described herein will substantially increase the handleability of the composition without impeding its swellability. To achieve the full advantage of this embodiment, the elastomer should be included in an amount of about 2% to about 10% based on the total weight of the clay composition. Mastication or shearing, i.e., in a sigma blender or twin screw extruder, of a water-swellable clay composition containing a water-swellable clay, such as sodium bentonite, together with polypropene and/or polybutene, and an elastomer, increases the d-spacing between adjacent clay platelets resulting in an increased capacity of the composition to swell in an amount greater than the water-swellable clay alone; and greater than the water-swellable clay, polypropene/polybutene composition without the elastomer.

In accordance with another important embodiment of the compositions and methods described herein, the polybutene and/or polypropene is intercalated between clay platelets during shearing to form an intercalated clay, including clay tactoids having 20 or less stacked clay platelets, and individual exfoliated clay platelets surrounded by the polybutene and/or polypropene. Sufficient shear is imparted to the composition to achieve intercalation of the polybutene and/or polypropene, and at least partial exfoliation of the clay platelets, such as by mixing in a sigma blender or by auger extrusion, as shown in FIG. 1.

Essentially any elastomer, preferably having at least 100% elongation and, more preferably having at least 500% elongation, can be used in the preferred water-swellable clay composition of the present invention to substantially improve the handleability, cohesiveness and structural integrity of the water-swellable clay composition and multi-layered articles manufactured. Partially cross-linked elastomers have been found to be most suitable in improving the consistency, handleability and structural integrity of articles requiring such properties, but elastomers which are not cross-linked are also useful, particularly those polymers which are capable of being lightly cross-linked when subjected to the heat generated within the blender, i.e., sigma blender or twin screw extruder, during mastication and mixing with the other clay composition components. Fully cross-linked elastomers generally are not suitable for incorporation into the clay composition of the present invention since their elongation capacity is insufficient to permit full expansion of the water-swellable clay during hydration. However, any elastomer having at least 100% elongation is suitable as a component of the water-swellable clay composition of the multi-layered articles described herein, and included within the scope of the present invention.

Suitable elastomers for incorporation into the preferred clay composition include butyl rubber, halogenated butyl rubber, styrene-butadiene, other synthetic and natural rubbers, ethylene-propylene copolymers and terpolymers, and partially cross-linked butyl rubbers having divinylbenzene added to form a terpolymer for the purpose of imparting a degree of "cure". The elastomer can be shredded prior to mastication with the water-swellable clay and polypropenes and/or polybutenes to decrease mixing time, although shredding is not necessary. Mastication and homogeneous flow of the elastomer throughout the water-swellable clay composition can be achieved with the elastomer in any desired shape, i.e., pellet form, for example in a sigma blender.

A preferred water-swellable clay composition includes a water-swellable clay, such as sodium bentonite, in an amount of 10–90% by weight, an elastomer in an amount of 1–20% by weight, and optionally any plasticizer compatible with the elastomer and capable of plasticizing the elastomer, in an amount of 2–50% by weight based on the total weight of the clay composition. The plasticizer improves the workability of the elastomer, extends the elastomer, enables the elastomer to reposition itself with expansion of the water-swellable clay, when the clay is wetted, and wets the water-swellable clay surface sufficiently to enable the elastomer to accept substantial amounts of the water-swellable clay (up to about 90%) and to provide a homogeneous clay distribution throughout the elastomer in the clay composition.

An elastomer having an elongation of at least 100% will permit the water-swellable clay to substantially completely expand upon water contact so long as the elastomer includes a plasticizer in an amount of at least 2% based on the total weight of the clay composition. The elastomer provides exceptionally good structural integrity to the clay composition without substantially inhibiting the swellability of the clay. The elastomers preferably are partially, but not completely, cross-linked.

Suitable optional plasticizers are the relatively low polarity plasticizers including epoxidized oils, such as epoxidized soybean oil; alkyl monoesters such as butyl oleate; long chain partial ether esters, such as butyl cellosolve oleate; long chain alkyl diesters, such as dioctyl adipate and dioctylphthalate; and petroleum-derived plasticizers such as aromatic-napthenic oils; napthenic-aromatic oils, napthenic-paraffinic oils; and paraffinic oil.

To achieve the full advantage of this clay/plasticizer embodiment for the clay composition, the plasticizer should be included in the clay composition in an amount of at least about 2% by weight of the composition to plasticize the elastomer and fully wet-out the bentonite. The plasticizers generally are included in an amount of about 5% to about 20% by total weight of the clay composition.

The water-stop compositions are exemplified in Table I as follows:

and 3 show the unexpected increased water-swellability resulting from the smaller clay particle size (Table 2) and the unexpected increased d-spacing attributable to the smaller clay particle size:

TABLE 2

(FIG. 1)

| Clay Particle Size Range (Microns) | Weight Percent Swell Increase |
|---|---|
| 0–50 | 476 |
| 50–100 | 432 |
| 100–150 | 367 |
| 150–200 | 298 |
| 200–250 | 243 |
| 250–300 | 212 |
| 300–350 | 183 |
| 350–400 | 167 |

TABLE I

| Composition Material | Preferred Wt. % | Wt. % Range | Wt. % Preferred Range | Function |
|---|---|---|---|---|
| clay*, preferably a smectite clay | 75 | 10–90 | 50–85 | water-swellability for water-sealing |
| elastomer, preferably having at least 100% elongation, e.g., butyl rubber | 5 | 1–30 | 2–10 | keeps composition as a cohesive mass for staying in position |
| polybutene and/or polypropene | 15–16 | 8–65 | 10–20 | intercalates between clay platelets to achieve higher d-spacing and greater clay swell and tackifies the composition |
| colorant (liquid or solid) e.g., activated charcoal | 1 | 0–5 | 0.5–2 | coloration of composition |
| filler, e.g., calcium carbonate | 2.5 | 0–20 | 1–5 | for cost reduction in lowering percentage of more expensive components, e.g., clay |
| clay binder onium ions or coupling agent | 0.5 | 0.1–20 | 0.2–10 | expands d-spacing of clay for intercalation of polypropene and/or polybutene and strengthens the composition by cross-linking the clay platelets to the elastomer |

*The clay includes about 10% by weight water and the clay percentages are based on bone dry clay; all weight percents are based on the total dry weight of the composition (with 0% water).

In accordance with another embodiment of the compositions and methods described herein, it has been found that more finely ground clay, a portion (e.g., 1–30% by weight) in the range of 0 to 50 microns, and/or a portion (e.g., 1–50% by weight) in the range of 50 to 100 microns, and/or a portion (e.g., 1–50% by weight) in the range of 50 to less than 150 micron clay particles achieve unexpectedly larger d-spacing between clay platelets and the composition swells unexpectedly more when mixed together with the polypropene and/or polybutene and clay binder in accordance with the compositions described herein. The following Tables 2

TABLE 3

(FIG. 2)
EFFECT OF D-SPACING AND CLAY PARTICLE SIZE ON PERCENT ABSORBENCY

| Clay platelet d-spacing | Percent Absorbency using 150–200 micron clay | Percent Absorbency using 50–100 micron clay |
|---|---|---|
| 8.4 | 324 | 371 |
| 9.1 | 346 | 397 |

TABLE 3-continued (FIG. 2)
EFFECT OF D-SPACING AND CLAY PARTICLE SIZE ON
PERCENT ABSORBENCY

| Clay platelet d-spacing | Percent Absorbency using 150–200 micron clay | Percent Absorbency using 50–100 micron clay |
|---|---|---|
| 9.6 | 361 | 416 |
| 9.9 |  | 426 |
| 10.3 |  | 442 |
| 10.6 | 398 |  |
| 10.9 | 405 | 464 |
| 11.4 |  | 481 |
| 11.9 | 427 |  |
| 12.5 | 436 | 512 |
| 12.8 | 441 | 521 |
| 13.7 |  | 541 |
| 14.6 | 469 |  |
| 15.3 | 475 | 572 |
| 15.8 | 487 |  |
| 17.1 |  | 602 |
| 17.6 | 509 |  |
| 18.4 |  | 629 |
| 19.5 | 529 | 642 |

EXAMPLES

Example 1

Example 1 demonstrates the preparation of Octadecylamine (ODA) onium ion-intercalated sodium montmorillonite.

One hundred grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to 75 to 80° C. 37.8 g of Octadecylamine, available from Akzo Nobel, was mixed with 70 ml, 2 N HCl in 1 liter 75 to 80° C. de-ionized water. The amine-HCl solution was introduced to the clay dispersion, followed by vigorous mixing. The mixture was maintained at 75 to 80° C. for about 30 minutes, followed by a de-watering process, such as filtration. The filter cake was re-dispersed into 4 liters 75 to 80° C. water and the solid was collected and placed into a 75 to 80° C. oven to dry followed by particle size reduction. The filter cake also can be freeze-dried. The dried material has a d001 of 22 Å as measured by X-ray diffraction.

Example 2

Example 2 demonstrates the formation of silane coupling agent-reacted and onium ion-intercalated clay.

One hundred grams of Na-montmorillonite clay commercially available from Nanocor, Inc. (Arlington Heights, Ill.) was dispersed in 3 liters of de-ionized water by mechanical paddle mixer or colloidal mill. The clay dispersion was heated to 75 to 80° C. 37.8 g of Octadecylamine (ODA), available from Akzo Nobel, was mixed with 70 ml 2 N HCl in 1 liter 75 to 80° C. de-ionized water. The amine-HCl solution was introduced into the clay dispersion, followed by vigorous mixing. The mixture was adjusted to pH 3 to 4 by acetic acid, and maintained at 75 to 80° C. for about 30 minutes. After thorough washing with de-ionized water, the Octadecyl-ammonium treated sodium montmorillonite clay was collected by filtration. The filter cake was re-dispersed into 3 liters of 75 to 80° C. water.

In a separate container, 2 g Octyltriethoxysilane (A137) was dissolved in 40 g 9:1 (w/w) blend of isopropanol and de-ionized water. The silane solution was stirred for 1 hour and then added to the dispersed clay slurry. After mixing 20 minutes, the solid was collected by filtration and placed into a 75 to 80° C. oven to dry followed by particle size reduction. The filter cake also can be freeze-dried. The dried material has a d001 of 22 Å as measured by X-ray diffraction.

Example 3

The procedure of Example 1 was repeated to produce a silane-reacted organoclay except that Octyltriethoxysilane was replaced by 3-aminopropyltri-ethoxysilane (A1100). The dried material has a d001 of 22 Å as measured by X-ray diffraction.

What is claimed is:

1. A water-swelling composition adapted to be secured to an area of potential water flow in the form of a flexible cohesive mass comprising about 10% to about 90% by weight of a water-swellable layered material; about 1% to about 20% of an elastomer; about 8% to about 65% by weight of a material selected from the group consisting of polypropene, polybutene, and a mixture thereof; and about 0.1% to about 20% by weight of a clay binder selected from group consisting of (1) an onium ion-liberating compound that is ion-exchanged with the layered material, (2) a coupling agent that is reacted with the layered material, and (3) a combination thereof.

2. The water-swellable composition of claim 1, wherein the composition includes about 50% to about 90% layered material; about 2% to about 10% elastomer; about 12% to about 20% of a material selected from the group consisting of polypropene, polybutene, and a mixture thereof; and about 0.2% to 10% by weight of the clay binder.

3. The water-swellable composition of claim 2, wherein the composition comprises about 35% to about 90% by weight layered material and wherein the polypropene, polybutene, or mixtures thereof is included in the composition in an amount of about 10% to about 20% by weight.

4. The water-swellable composition of claim 1, wherein the layered material is a smectite clay.

5. The water barrier of claim 4, wherein the smectite clay is selected from the group consisting of sodium bentonite, sodium montmorillonite, calcium bentonite, calcium montmorillonite, magnesium bentonite, magnesium montmorillonite, iron bentonite, iron montmorillonite, beidellite, nontronite, hectorite, saponite, sepiolite, and combinations thereof.

6. A method of manufacturing a water barrier in a shape of a rod or rope, having a length to width ratio of at least 10, comprising extruding the clay-containing composition of claim 1 to ion-exchange onium ions with internal layered material platelet cations.

7. The method of claim 6 further including intercalating the polybutene or polypropene between adjacent layered material platelets to exfoliate at least a portion of the layered material into individual platelets.

* * * * *